US012009616B2

(12) United States Patent
Urtz et al.

(10) Patent No.: US 12,009,616 B2
(45) Date of Patent: Jun. 11, 2024

(54) CLUSTER RF CONNECTOR WITH BIASING INTERFACE

(71) Applicant: JOHN MEZZALINGUA ASSOCIATES, LLC, Liverpool, NY (US)

(72) Inventors: Thomas Urtz, Liverpool, NY (US); Jeremy Benn, Liverpool, NY (US); Christopher Natoli, Baldwinsville, NY (US); Shawn Chawgo, Phoenix, NY (US)

(73) Assignee: John Mezzalingua Associates LLC, Liverpool, NY (US)

( * ) Notice: Subject to any disclaimer, the term of this patent is extended or adjusted under 35 U.S.C. 154(b) by 324 days.

(21) Appl. No.: 17/186,952

(22) Filed: Feb. 26, 2021

(65) Prior Publication Data

US 2021/0351550 A1 Nov. 11, 2021

Related U.S. Application Data

(60) Provisional application No. 63/132,886, filed on Dec. 31, 2020, provisional application No. 63/021,764, filed on May 8, 2020.

(51) Int. Cl.

*H01R 13/518* (2006.01)
*H01R 13/52* (2006.01)
(Continued)

(52) U.S. Cl.

CPC ....... *H01R 13/518* (2013.01); *H01R 13/5205* (2013.01); *H01R 13/5219* (2013.01);
(Continued)

(58) Field of Classification Search

CPC .............. H01R 13/518; H01R 13/5205; H01R 13/5219; H01R 13/62; H01R 13/625;
(Continued)

(56) References Cited

U.S. PATENT DOCUMENTS

| | | | |
|---|---|---|---|
| 4,227,765 | A | 10/1980 | Neumann et al. |
| 9,954,305 | B2 | 4/2018 | Yu et al. |

(Continued)

FOREIGN PATENT DOCUMENTS

| | | | |
|---|---|---|---|
| CN | 205960284 | U | 2/2017 |
| KR | 1020190064997 | A | 6/2019 |
| WO | 2014026383 | A1 | 2/2014 |

OTHER PUBLICATIONS

International Searching Authority, International Search Report and Written Opinion, dated Jun. 15, 2021, (9 pages).

(Continued)

*Primary Examiner* — Briggitte R. Hammond
(74) *Attorney, Agent, or Firm* — Barclay Damon LLP

(57) ABSTRACT

A cluster connector and cluster port for simultaneously engaging multiple RF connectors with a corresponding plurality of RF ports, wherein the cluster port may be coupled to an RF antenna or radio. The cluster port has a plurality of receiving interfaces wherein each of the receiving interfaces has an axial biasing element that enables simultaneous connection with a plurality of coupling interfaces, wherein each of the coupling interfaces is coupled to the end of an RF cable. The cluster connector of the disclosure also enables selective removal, replacement of one RF cable, and the corresponding coupling interface, without impacting other cables/coupling interfaces.

11 Claims, 16 Drawing Sheets

(51) Int. Cl.

| | |
|---|---|
| ***H01R 13/62*** | (2006.01) |
| ***H01R 13/625*** | (2006.01) |
| ***H01R 24/40*** | (2011.01) |
| ***H01R 25/00*** | (2006.01) |
| *H01R 13/645* | (2006.01) |
| *H01R 103/00* | (2006.01) |

(52) U.S. Cl.
CPC ........... *H01R 13/62* (2013.01); *H01R 13/625* (2013.01); *H01R 24/40* (2013.01); *H01R 25/003* (2013.01); *H01R 13/6456* (2013.01); *H01R 2103/00* (2013.01)

(58) Field of Classification Search
CPC .. H01R 24/40; H01R 25/003; H01R 13/6456; H01R 2103/00; H01R 13/62933; H01R 2201/02
See application file for complete search history.

(56) References Cited

U.S. PATENT DOCUMENTS

| | | | | |
|---|---|---|---|---|
| 10,386,585 | B2 * | 8/2019 | Kaplan ................ | G02B 6/4471 |
| 10,608,392 | B2 * | 3/2020 | Duan ................. | H01R 13/6588 |
| 2019/0157823 | A1 | 5/2019 | Duan et al. | |
| 2019/0165524 | A1 | 5/2019 | Grabl et al. | |
| 2019/0221969 | A1 | 7/2019 | Ruffini et al. | |

OTHER PUBLICATIONS

European Patent Office, Extended European Search Report, Date of mailing: Apr. 11, 2024, 21 pages.

* cited by examiner

CLUSTER RF CONNECTOR WITH BIASING INTERFACE

RELATED APPLICATION/PRIORITY CLAIM

This application is related, and claims priority to, commonly-owned Provisional Patent Application Ser. No. 63/021,764 filed May 8, 2020 entitled "Cluster RF Connector with Biasing Interface", and 63/132,886, filed Dec. 31, 2020, having the same title.

FIELD OF THE INVENTION

The present invention relates to wireless communications, and more particularly, to RF connectors for providing multiple mechanically strong connections in a compact space.

BACKGROUND OF THE INVENTION

A current trend in RF antenna design relates to configurations which are significantly smaller while, at the same time, incorporating an increased number of ports. The smaller size is due to the use of higher frequency bands than traditional cellular communications. Antennas designed to operate at higher frequency bands subsequently have smaller antenna radiators. Further, for these antennas to take advantage of beamforming and improved gain pattern performance must have its radiators spaced closely together. This presents an opportunity in that smaller antennas may be more easily deployed indoors and may be more easily deployed in dense urban environments.

One trend in modern antenna design relates to an increased number of ports driven by a number of factors, including: (i) multi-band radiator configurations, and (ii) beamforming, MIMO (Multiple Input Multiple Output) designs. With respect to the former, radiators of different geometries, e.g., those designed to operate at different frequency bands, are deployed on a single antenna array face. Regarding the latter, multiple independent channels are transmitted and received simultaneously over the same band, or a single channel is transmitted and received over multiple radiators. Furthermore, the radiators may be differentially-phased to provide beamforming.

The reduced antenna size and increased number of ports can present a variety of challenges and difficulties to antenna designers. In particular, multiple separate RF ports on the antenna leads to the following problems: (1) difficulty installing or removing RF connectors when the ports are densely-packed on a small antenna; and (2) reduction in the size of individual RF ports and connectors, which my typically result in a mechanically inferior and weaker RF connection.

One solution may involve a single cluster port and connector. However, such cluster connectors present other unique design challenges. For example, a high-quality RF connection requires that each independent RF connection have highly precise axial and concentric alignment between the port and the corresponding connector. Additionally, each interface must be mechanically joined to all other interfaces with high precision to maintain performance. As a consequence, such connectors are prohibitively expensive and suffer from assembly difficulties. That is, cluster connectors manufactured with corresponding cables can be nearly impossible to disassemble for the purpose of replacing a single cable. In other words, if a single cable or connection malfunctions, the only available option is to replace the entire cluster connector and multi-cable jumper.

Accordingly, a need exists for an RF cluster port and connector which provides precise RF electrical performance and sufficient mechanical strength yet enable replacement of individual jumpers within a cluster connector, including the ability to selectively remove a jumper while the remaining jumpers in the cluster connector are operating.

SUMMARY OF THE INVENTION

In one embodiment, a cluster connector is provided comprising a primary connector body having a plurality of connector apertures, a secondary connector body including a hard mate lock. The clustor connector furthermore including a plurality of coupling interfaces, each corresponding to a jumper, disposed at least partly within a corresponding connector aperture, and having a jumper lock mechanism disposed on an outer surface. The jumper lock mechanism enables removal of its corresponding jumper without disturbing other jumper cables associated with adjacent coupling interfaces.

In another embodiment, a cluster port comprises a primary port body having a plurality of port apertures; and a plurality of receiving interfaces each being disposed within a corresponding port aperture. A plurality of axial biasing means are located axially between a corresponding receiving interface and the primary port body.

In another embodiment a cluster port comprises a first port body having a plurality of port apertures, a plurality of receiving interfaces, each receiving interface disposed within a corresponding port aperture; and a plurality of biasing elements, each being disposed within a corresponding aperture located axially between a corresponding receiving interface and the first port body.

Another aspect of the present invention involves a cluster port. The cluster port comprises a first port body having a plurality of port apertures, a soft mating means and a hard mating means; a plurality of receiving interfaces, each of the receiving interfaces disposed within a corresponding port aperture; and a plurality of axial biasing means. Each of the plurality of axial biasing means are disposed axially between each of the plurality of receiving interfaces and the first port body.

In yet another embodiment, the cluster connector comprises a primary body having a plurality of apertures; and a plurality of jumpers. Each of the jumpers correspond to an aperture, and includes an RF plug, a coupling interface, and an axial biasing element disposed between the RF plug and the coupling interface. The RF plug and coupling interface are configured to translate axially relative to one another over a zone of axial deflection. Furthermore, each coupling interface is configured to allow removal and insertion of a jumper assembly without affecting operation of the other jumper assemblies.

In another embodiment, the cluster connector comprises a connector body having a plurality of connector apertures, a hard mate lock coupled to the connector body and configured to connect the connector body to a cluster port and a plurality of coupling interfaces, each disposed at least partly within a corresponding one of the plurality of connector apertures and configured to translate axially relative to the connector body. The cluster connectro furthermore includes an axial biaing element configured to effect axial displacement of each coupling interface relative to a respective connector aperture.

In yet another embodiment, a cluster connector comprises a connector body including a clamping means and a plurality of apertures configured to receive a jumper. Each jumper includes a coupling interface and a jumper lock mechanism, wherein the jumper lock mechanism is configured to enable the corresponding jumper to be individually inserted and removed without affecting the other jumpers.

Another aspect of the present invention involves a cluster connector. The cluster connector comprises a first body having a plurality of apertures; and a plurality of jumper assemblies, each jumper assembly corresponding to an aperture, each jumper assembly having an RF plug and a coupling interface, and an axial biasing element disposed in a cavity between the RF plug and the coupling interface, the RF plug and coupling interface configured to translate axially relative to one another over a zone of axial deflection, wherein each coupling interface is configured to allow removal and insertion of its corresponding jumper assembly without affecting operation of each of the other jumper assemblies.

Another aspect of the present invention involves a cluster port. The cluster port comprises a cluster port body having a plurality of apertures; a plurality of receiving interfaces, each of the plurality of receiving interfaces disposed in a corresponding aperture; an axial biasing pad disposed on an outward facing portion of the cluster port body, the axial biasing pad configured to make contact with a cluster connector body; and a counterpart clamping means.

DESCRIPTION OF EXEMPLARY EMBODIMENTS

Figure 1:
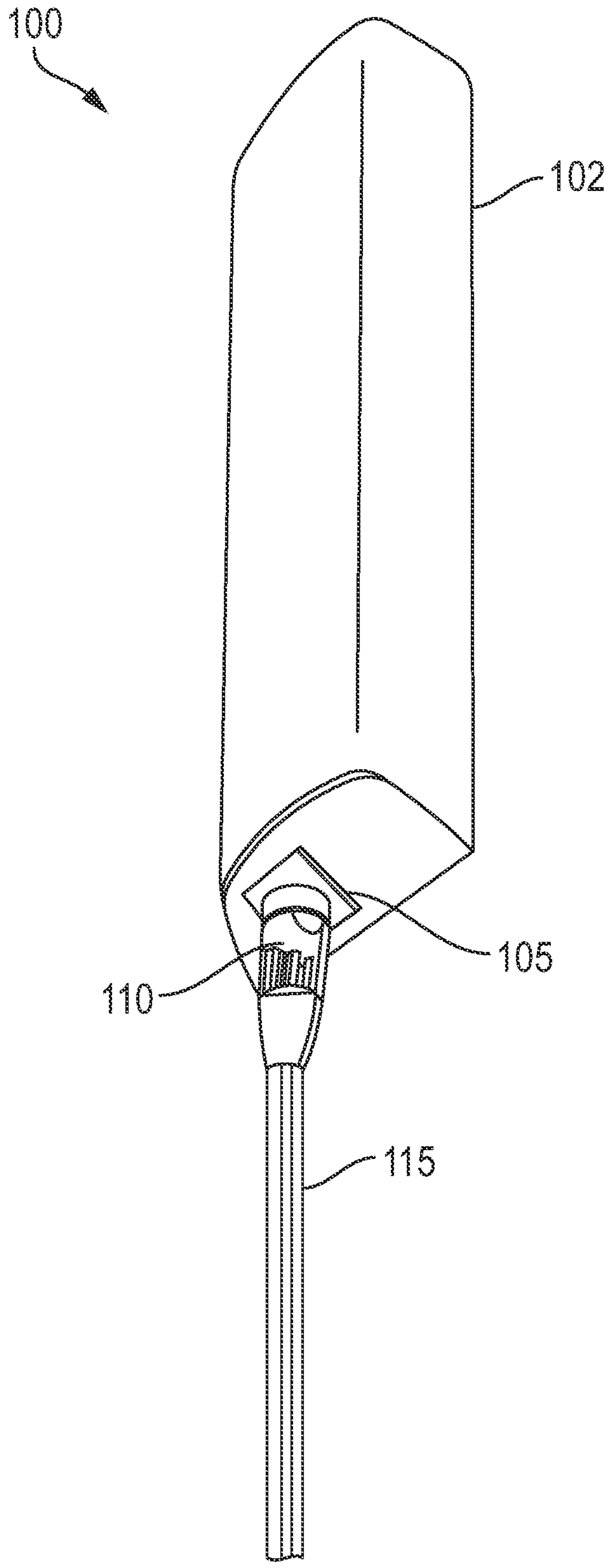
FIG. 1 illustrates an embodiment of an antenna equipped with a cluster connector according to the present disclosure.

FIG. 1 illustrates an exemplary embodiment 100 of an antenna 105 equipped with a cluster connector according to the present disclosure. As illustrated, cluster connector 110 is coupled to cluster port 105, which is electrically coupled to antenna 102, e.g., a telecommunications antenna. The coupling of the connector 110 and port 105 enables RF signals carried on RF cables to connect to corresponding radiators (not shown) within antenna 102. Antenna embodiment 100 may be a macro antenna installation at the top of a cell tower, a multi-band antenna mounted on the side of a building in an urban setting, an in-building (i.e., or a Distributed Antenna System or (DAS)) cellular antenna, etc. It will be appreciated that variations of the type described are contemplated within the breadth and scope of the disclosure.

Figure 2:
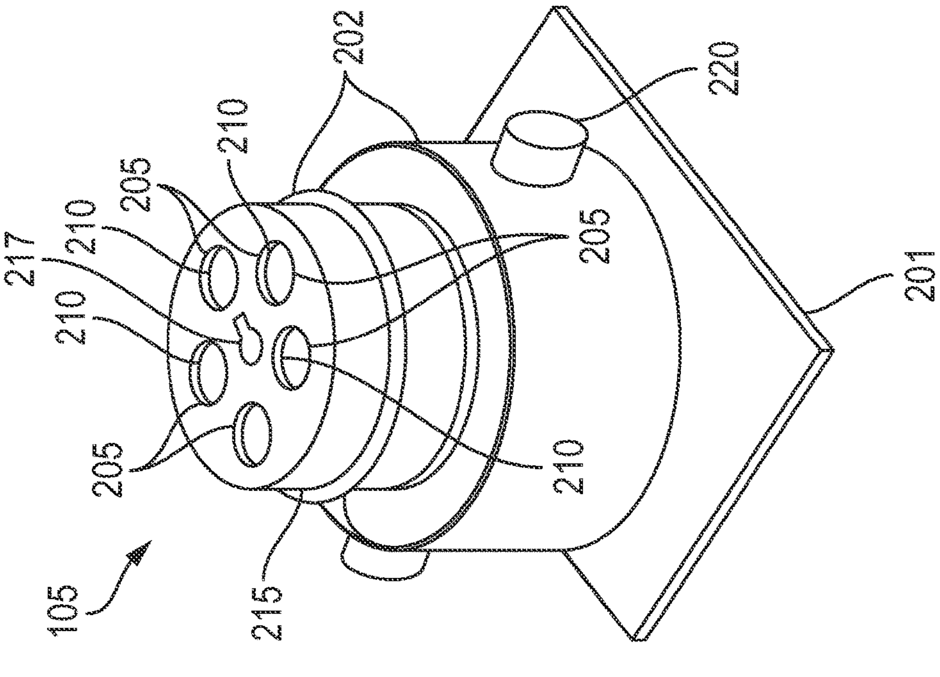
FIG. 2 illustrates an isolated perspective view of a cluster port according to the present disclosure.
Figure 4:
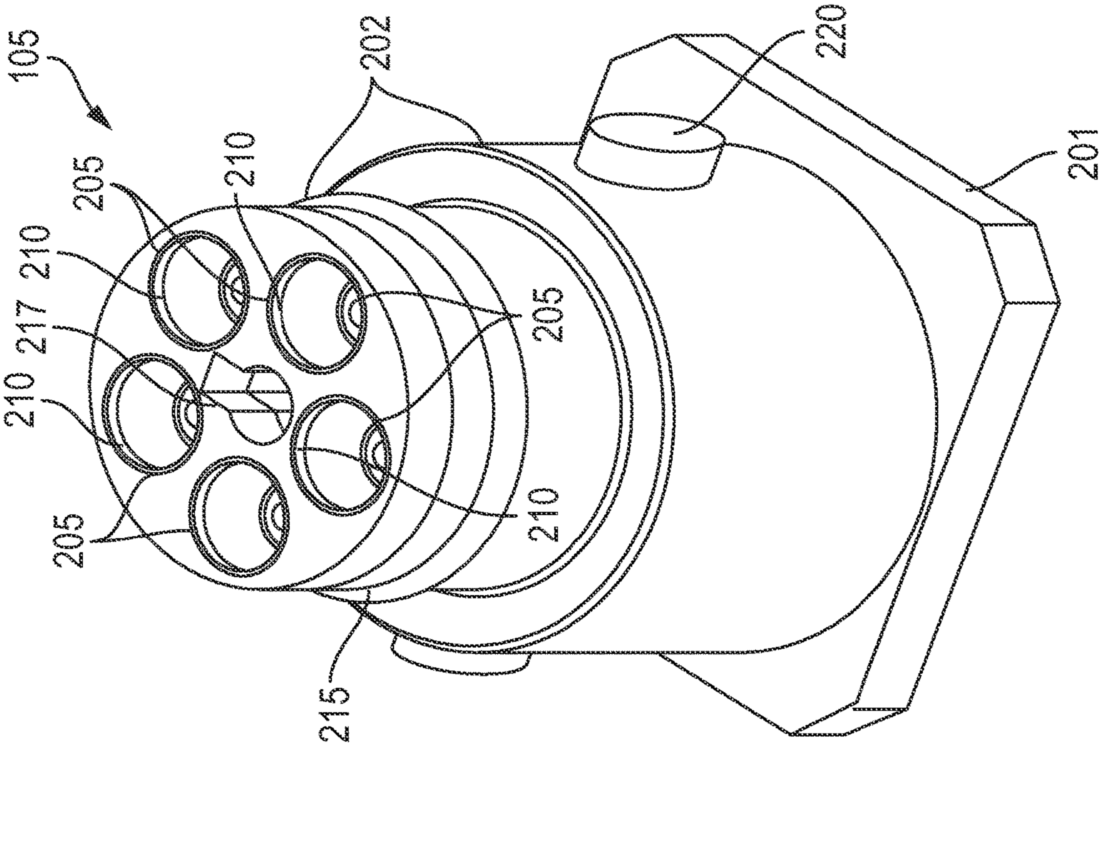
FIG. 4 is a detailed perspective view of a cluster port shown in FIG. 2.

FIGS. 2 & 4 illustrate an exemplary cluster port 105 including a mounting flange 201 and a port body 202 having a plurality of apertures 205 defining a receiving interface 210. As illustrated, port body 202 comprises two segments, a first segment defining the port apertures 205 and a second segment having hard-mate lock 220. In the illustrated embodiment, the hard-mate lock 220 is a conventional twist lock, although it will be understood that other locking means are possible within the scope of the present disclosure. The first segment comprises a soft-mate O-ring 215 and a guide key 217, operative to inhibit the improper mating of the cluster connector 110, i.e., to prevent incorrect angular alignment, orientation.

Figure 3:
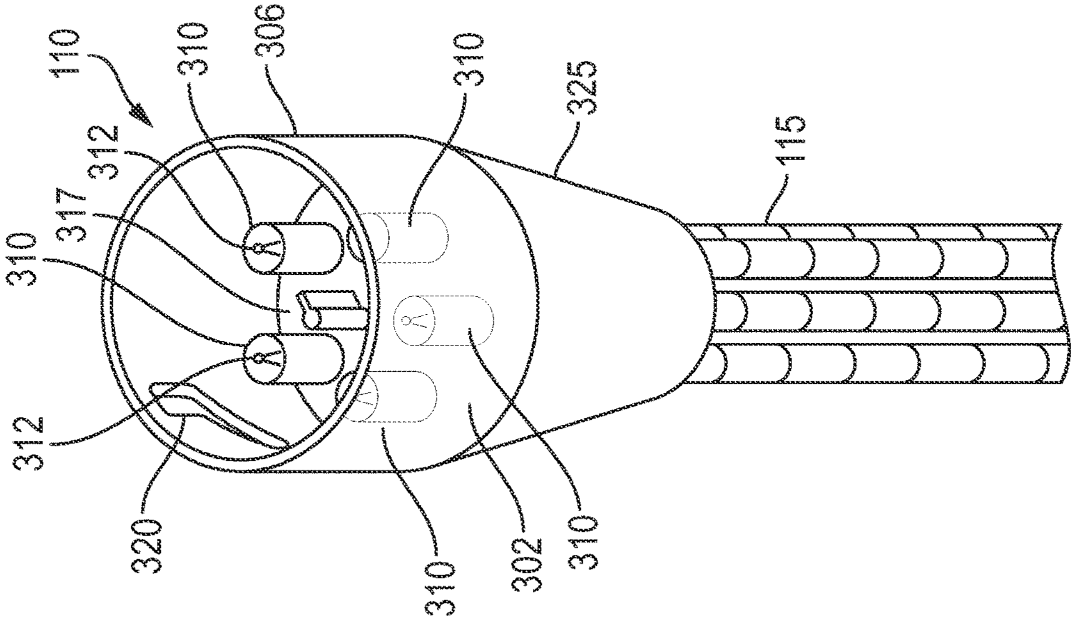
FIG. 3 illustrates an isolated perspective view of the cluster connector according to the present disclosure.
Figure 5:
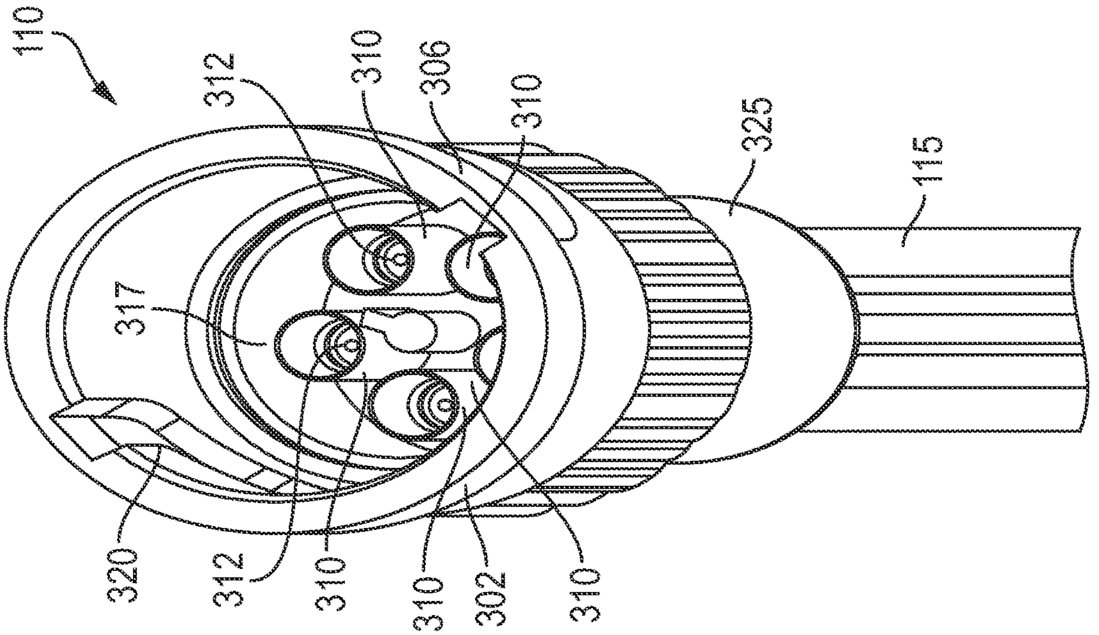
FIG. 5 is a detailed perspective view of the cluster connector shown in FIG. 3.

As used herein, the term "jumper" may refer to an integrated jumper including a coupling interface installed on an RF cable; a combination of RF connector and coupling interface installed on an RF cable; or a combination of RF plug and coupling interface that may be later installed onto an RF cable. Further, as used herein, the coupling interface 1520 may include an integrated RF connector or RF plug. It will be understood that such variations are possible and within the scope of the disclosure FIGS. 3 & 5 illustrate an exemplary cluster connector 110 according to the present disclosure including first and second connector bodies 302 and 325, respectively. The first body 302 includes a plurality of connector apertures each comprising a coupling interface 310 extending outwardly from the connector aperture, and disposed within each coupling interface 310 is an inner conductor 312. The first connector body 302 includes a guide key 317 while the second connector body 325 includes a coupling nut 306 configured to facilitate rotation between the first and second connector bodies, 302 and 325, respectively. Additionally, the coupling nut 306 includes a hard mate lock 320, which engages the hard-mate lock 220 of the cluster port 105.

While the illustrated embodiment includes five apertures 210, receiving interfaces 210, coupling interfaces 310, and corresponding jumper 115, it will be appreciated that any number of apertures or interfaces are contemplated within the breadth and scope of the present disclosure. Further, it will be understood that the coupling interface disclosed herein includes an RF plug mechanism as found in conventional RF connectors or jumpers.

Figure 6:
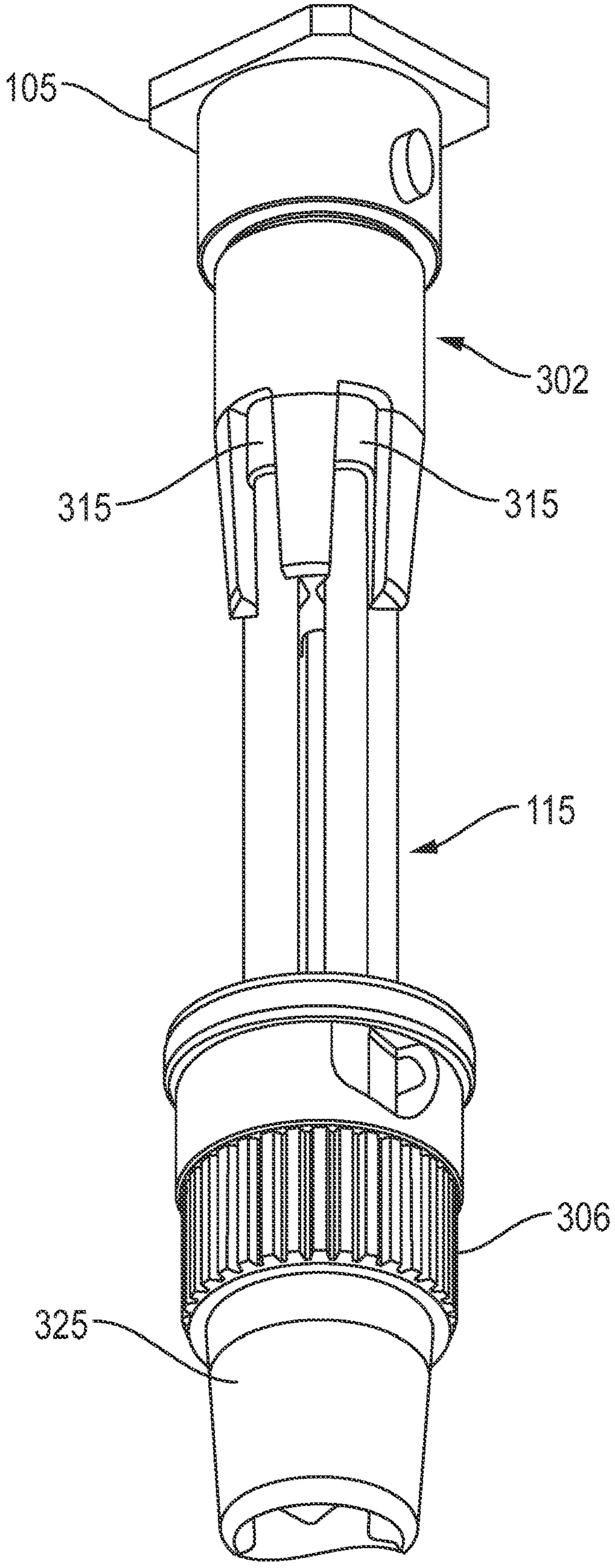
FIG. 6 illustrates a first and second body of the exemplary cluster connector, with the primary body coupled to the cluster port.

FIG. 6 illustrates the cluster connector 110 coupled to the cluster port 105, however, the second body 306 is decoupled from, disengaged form the hard mate lock 220, 320, and translated axially along the jumpers 115 to reveal first connector body 302 coupled to cluster port 105. Mechanically coupled to first connector body 302 are the coupling interfaces 315 and their corresponding jumpers 115.

Figure 7:
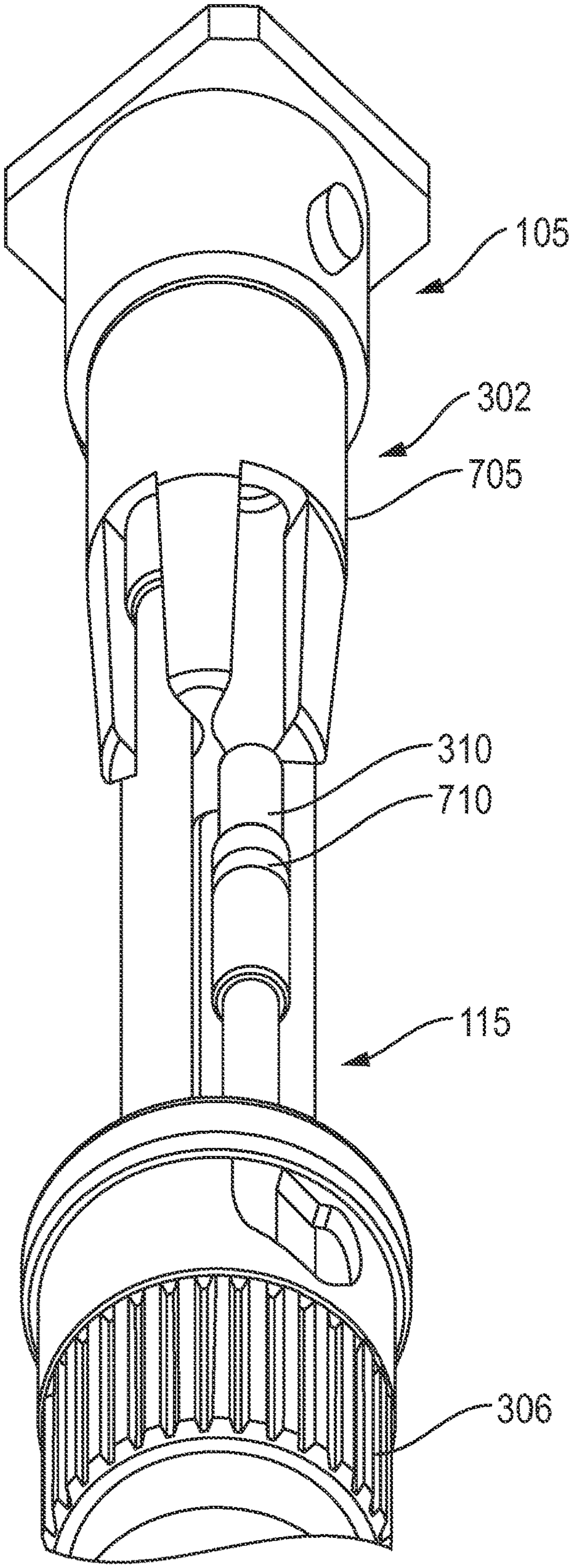
FIG. 7 illustrates first and second body of the cluster connector of FIG. 6, wherein the first body is coupled to the cluster port and wherein one of the RF jumpers has been separated from a respective aperture of the first body illustrating a coupling interface together with a soft secure O-ring.

FIG. 7 illustrates the cluster connector 110 and cluster port 105 of FIG. 4, but with one of its jumpers 115 removed, revealing its coupling interface 310 and a soft-secure O-ring 710. The soft-secure O-ring 710 provides a frictional engagement between the coupling interface 310 and the first body 302, and keeps the coupling interface 310 secure during insertion before the hard mate lock 220/320 can be engaged to couple the cluster connector 110 and the cluster port 105. Further, the soft-secure O-ring 710 provides friction such that it may be manually overcome, enabling a technician to remove, insert coupling interface 310 (and thus corresponding jumper 115) from/into its corresponding receiving interface 210. As used herein, the O-ring 710 is functionally similar to a jumper lock mechanism, such that an individual coupling interface 310 (and its corresponding jumper 115) can be individually removed and reinserted without affecting signal transmission in the other jumpers 115.

Figure 8:
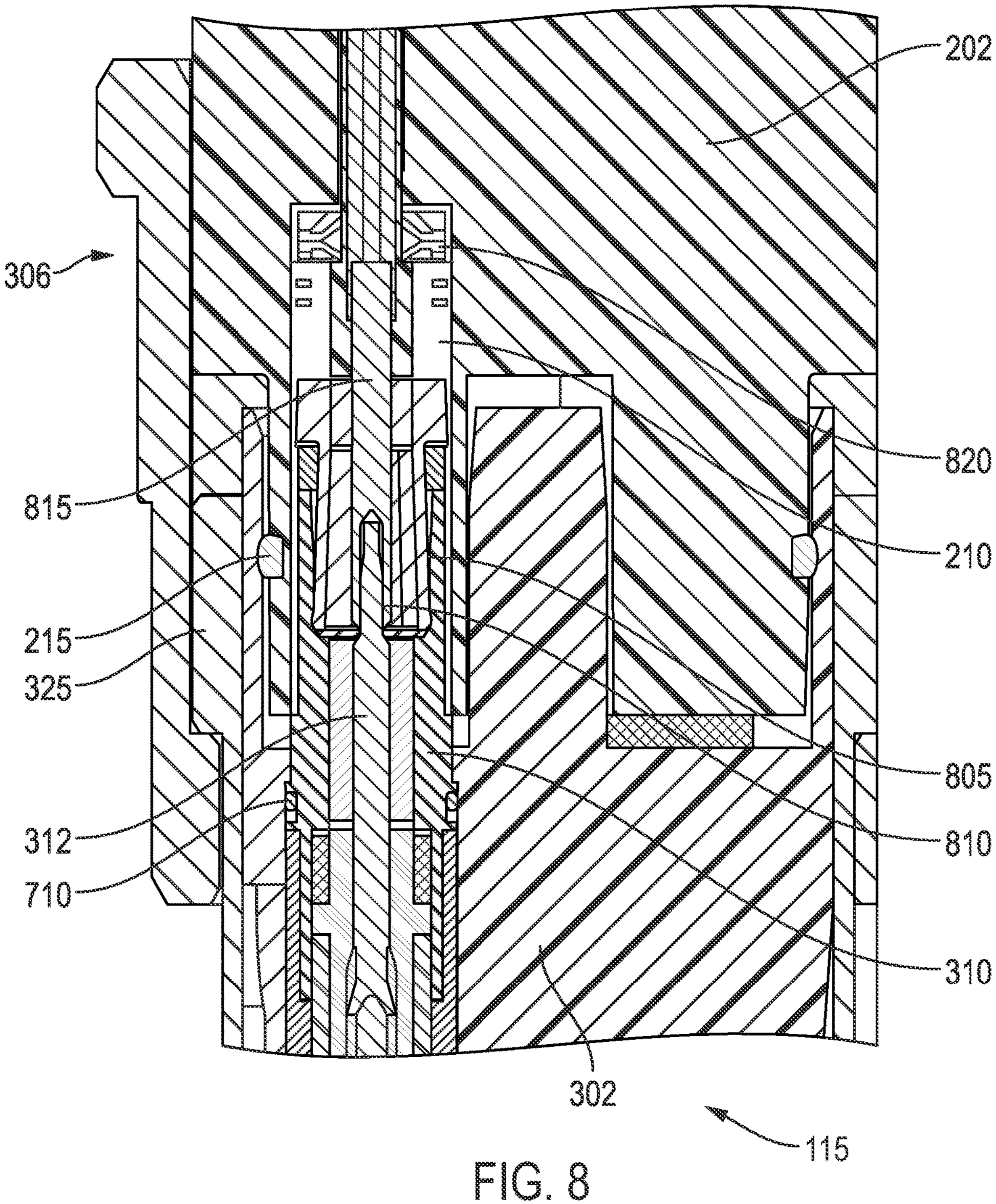
FIG. 8 is a cross-sectional view of the cluster connector engaging the cluster port, including an individual RF jumper connected via corresponding coupling and receiving interfaces and an element disposed within and between the receiving interface and a forward portion of the RF jumper.

FIG. 8 is a cross sectional view of the exemplary cluster connector 110, including an individual jumper 115 connected via its corresponding coupling 310 and receiving interface 210. As illustrated, the inner conductor 312 of coupling interface 310 (which is installed on jumper 115) is inserted into the inner conductor basket 810 of the receiving interface 210, whereby the inner conductor basket 810 is disposed at the end of the inner conductor 815. Electrical continuity is achieved by radial contact between inner conductor 312 and inner conductor basket 810. Additionally, electrical continuity of the outer conductor of the coupling interface 310 is achieved by insertion of the coupling interface 310 with the outer conductor basket 805 of the receiving interface 210.

The engagement of coupling interface 310 of the jumper 115 is established by the O-ring 710 as the cluster connector 110 is mechanically coupled with the counterpart receiving interface 210. Inasmuch as each jumper 115 is independent, i.e., each is independently held within first connector body 302 via its respective soft-secure O-ring 710, each coupling interface 310 may engage its respective receiving interface 210 at different times during insertion. To ensure electrical continuity and proper insertion, an axial biasing element 820 is disposed axially between the given receiving interface 210 and cluster port body 202. More specifically, the axial biasing element 820 provides an outward axial biasing force to augment engagement of the inner conductor 312 with the inner conductor basket 810, and the outer conductor of coupling interface 310 with outer conductor basket 805. Inasmuch as each coupling and receiving interface pair 310/210 includes an axial biasing element 820, each engages independently on insertion of the cluster connector 110 into cluster port 105. Further, the force required to mechanically engage the respective inner and outer conductors of coupling interface 310 and receiving interface 210 is less than the force required to deflect the individual axial biasing element 820 of the present disclosure. The axial biasing element 820 may be formed by a spring or other elastic member capable of axial compression or expansion. Such a member preferably displays characteristics that it remains unbiased or only partially biased while engaging the cluster port. Forces typical of this interaction range from about 15 to about 25 Newtons, depending on the design of the connector and port interfaces.

Figure 9:
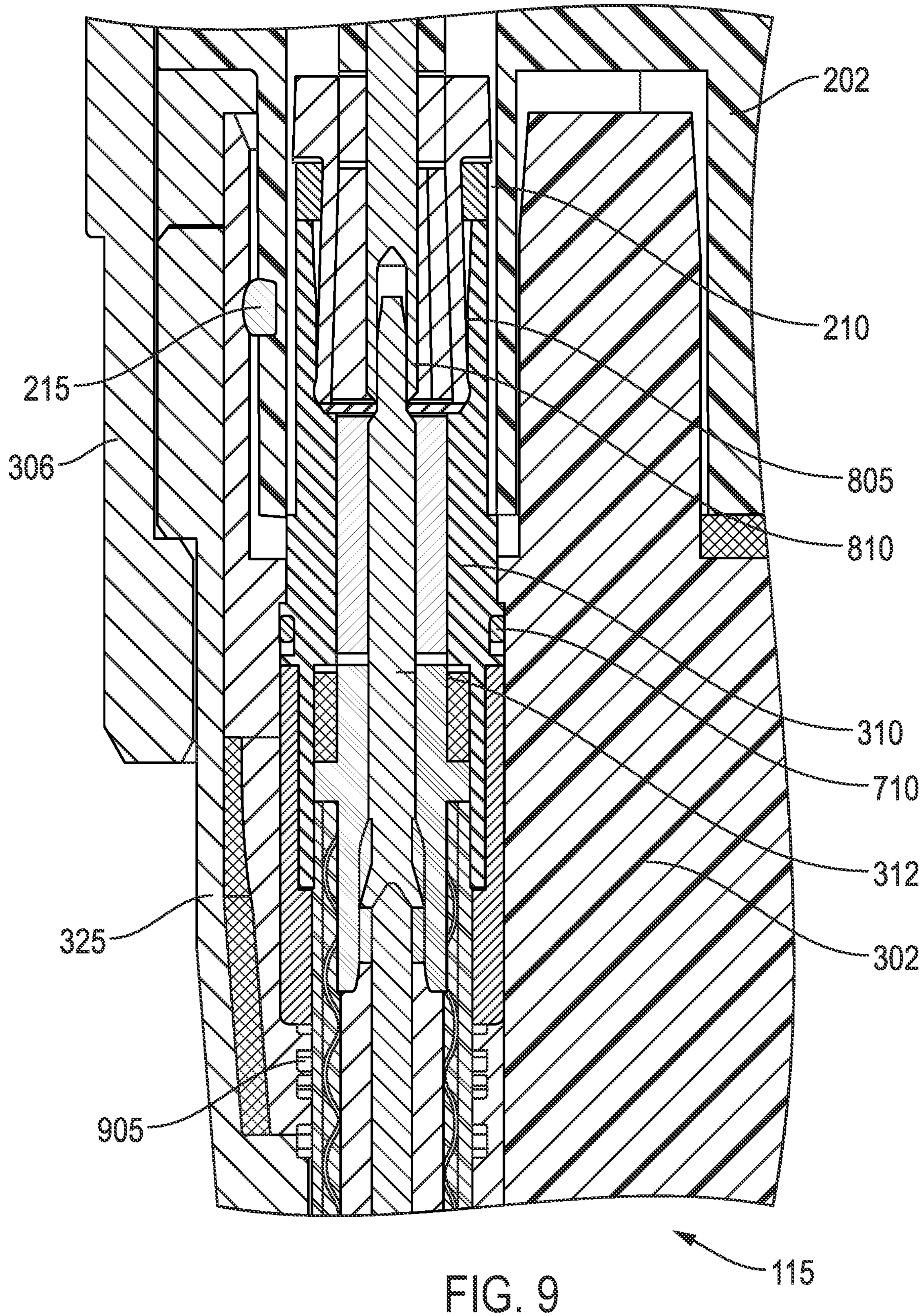
FIG. 9 is a cross-sectional view of the cluster connector engaging the cluster port, including an individual RF jumper having an axial biasing element disposed within and between the connector body and a rearward portion of the RF jumper.

FIG. 9 illustrates the connection between coupling interface 310 and the outer conductor jacket of jumper 115. Therein, the jumper 115 is inserted within the first and second connector bodies 302, 325, which are kept stable by a radial biasing element 905. The radial biasing element 905 may be formed from an elastic member such as an elastomer sleeve interposed therein, or from a suitably thin polymer or elastic metal flange such as a Belleville or leaf spring within the first connector body 302. Such element allows for small radial displacement of the coupling interface 310 with respect to the first connector body 302, typically allowing for motion of less than one millimeter radially.

Figure 10:
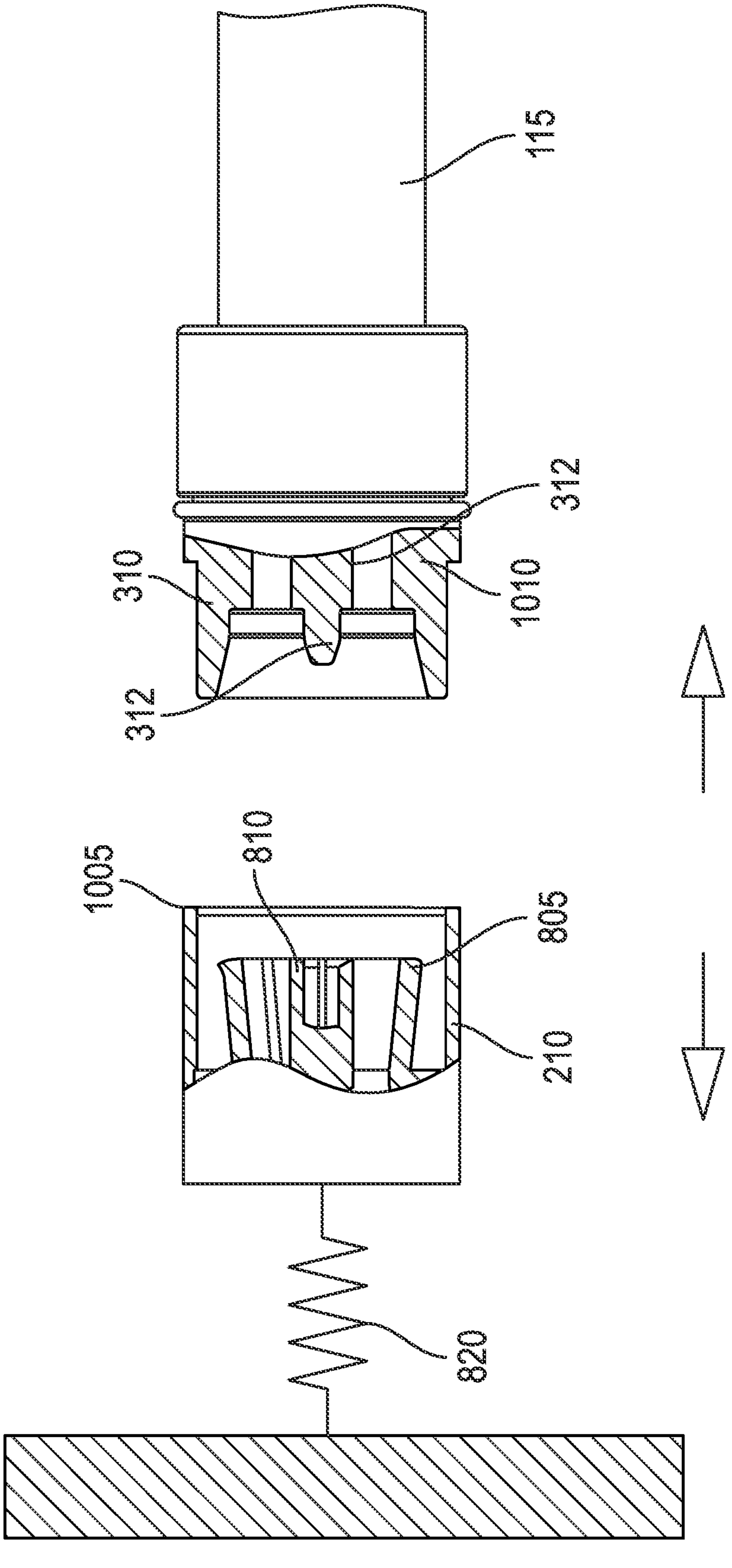
FIG. 10 illustrates one embodiment of a jumper having a coupling interface mating with a receiving port interface, wherein an axial biasing element urges the receiving port interface toward the coupling interface.

FIG. 10 is a schematic illustration of a coupling interface 310 disposed at the end of a jumper 115, a receiving interface 210, and an axial biasing element 820, represented as a coil spring. The receiving interface 210 is radially fixed within its corresponding aperture 205 of the interface port body 202 (see FIG. 2), but may translate axially within aperture 205 (not shown). The axial biasing element 820 provides a biasing force such that the default axial position of the receiving interface 210 is the outer extent of its displacement motion within aperture 205 (the outward direction corresponding to a displacement away from the axial biasing element 820). When the coupling interface 310 is inserted into the receiving interface 210, the two interfaces 310/210 translate relative to each other such that the inner conductor 312 engages with inner conductor basket 810 and the outer conductor of the coupling interface 310 engages the outer conductor basket 805. The two interfaces translate relative to each other on insertion until a first mechanical plane 1010 contacts a second mechanical plane 1005.

As mentioned above, the force required to engage the coupling interface 310 with the receiving interface 210 i.e., such that the first and second mechanical planes 1010/1005 meet, is less than the force required to deflect the axial biasing element 820. Accordingly, once the two mechanical planes 1010, 1005 meet, any additional inward motion is accommodated by the axial biasing element 820. Once engaged, the inner conductor 312 mates with the inner conductor basket 810 such that the inner conductor basket 810 applies a radial force on the inner conductor 312 sufficient to ensure a strong electrical connection therebetween, even with minor axial displacements between the coupling and receiving interfaces 310/210. Similarly, the outer conductor basket 805 mates with the outer conductor such that it applies sufficient force to ensure a strong electrical connection even in the presence of minor axial displacements between coupling and receiving interfaces 310/210.

The cluster connector according to the present disclosure enables the removal or/swapping-out of one of the jumpers 115 without disturbing the operation of the other jumpers 115. This is accomplished by a combination of various factors, including soft secure, hard secure, soft mating, and hard mating elements. Soft secure and hard secure elements relate to the securing (or enabling changing of) a given jumper 115 within a cluster connector 110. Soft and hard mating elements relate to the mating of the cluster connector 110 with the cluster port 105. Referring to FIG. 7, the soft secure element is accommodated by soft O-ring 710, which enables a technician to install and remove a jumper 115 (and its coupling interface 310) into/from the receiving interface 210. Referring to FIGS. 2 and 4, the hard secure element is accomplished by a rigid ledge integrated into the second cluster body which axially engages the aft portion of the coupling interface, preventing motion away from the receiving interface not accommodated by the biasing element 905. Soft mate is enabled by soft-mate O-ring 215, which is disposed on an inner cylindrical surface of the port body 202 (illustrated in FIGS. 2 and 4). The hard mating is accomplished by the hard mate lock 320 (disposed in, on the second connector body 325) operative to engage the hard mate lock 220 on an outer cylindrical surface of the cluster port body 202.

The cluster connector 110 of the disclosure enables individual jumpers 115 and their corresponding coupling interfaces 310 to be selectively removed or replaced without disturbing or interrupting the operation of the other jumpers 115.

Figure 11:
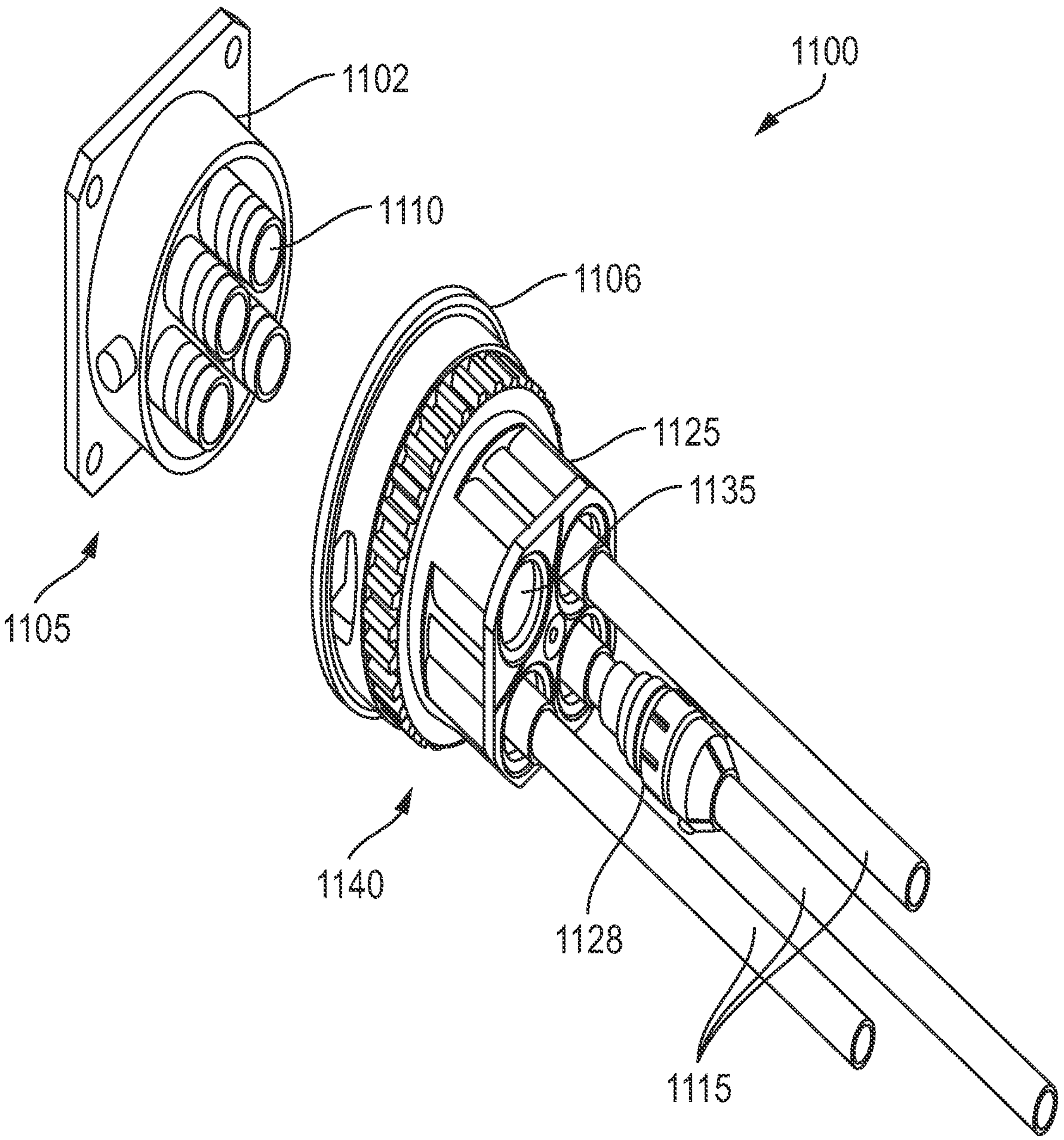
FIG. 11 illustrates another exemplary embodiment of the cluster port and cluster connector according to the disclosure.

FIG. 11 illustrates another exemplary embodiment 1100 of cluster port 1105 and cluster connector 1140 according to the present disclosure. Cluster port 1105 has a main port body 1102 and a plurality of receiving interfaces 1110 similar to the corresponding components of cluster port 105 shown in FIG. 2. Two variations of the cluster port 1105 are described in further detail below. Cluster connector 1140 has a first connector body 1125 and a second connector body 1106. The second connector body 1106 is rotatably coupled to the first connector body 1125.

The first connector body 1125 has a plurality of apertures 1135, into which may be inserted a corresponding coupling interface 1128, which is coupled to a corresponding jumper 1115. The second connector body 1106 may provide axial coupling between first connector body 1125 and the main port body 1102 using a twist lock (as illustrated) or other mechanisms, such as one or more nuts or screws in an array, a push-pull mechanism, a cam action device, friction fits, or press fits. Some of these variations may obviate the need for a second connector body that is rotatably coupled to first connector body 1125. It will be understood that such variations are possible and within the scope of the disclosure.

Figure 12A:
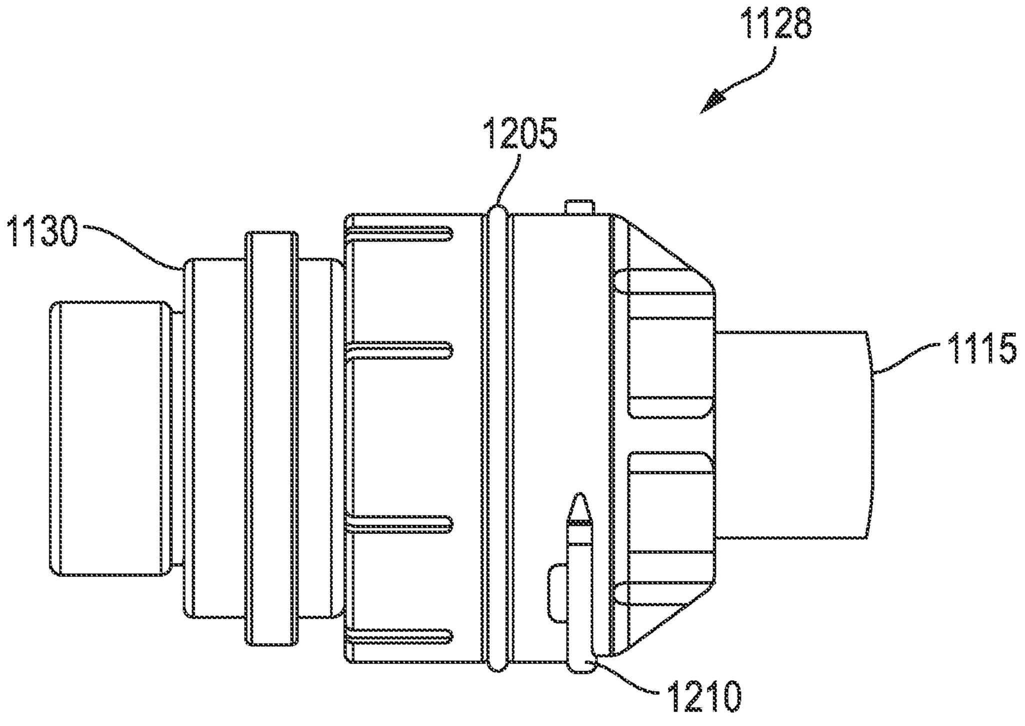
FIG. 12A illustrates yet another exemplary embodiment of a coupling interface according to the present disclosure.
Figure 12B:
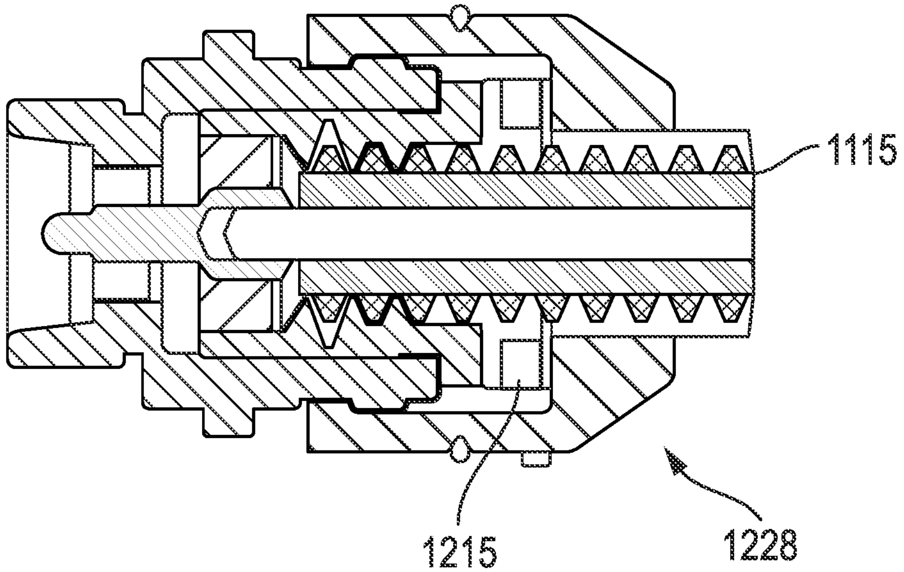
FIG. 12B is a cross sectional illustration of the coupling interface of FIG. 12A.

FIG. 12A illustrates an exemplary embodiment of a coupling interface 1128 illustrated in FIG. 11, while FIG. 12B is a cross sectional view of the coupling interface 1128. Disposed on the outer surface of coupling interface 1128 is a radial centering mechanism 1205, which acts to radially center the coupling interface 1128 within its corresponding aperture 1135. A radial centering mechanism 1205 may include an O-ring set in a groove formed on the outer surface of coupling interface 1128. Also disposed on the outer surface of coupling interface 1128 is a lock 1210, which may be engaged or released by rotating coupling interface 1128 within aperture 1135. Further to this exemplary embodiment, axial biasing may be provided by an axial biasing element 1215 (FIG. 12B) disposed in a cavity between RF plug 1130 and coupling interface 1128, providing a range of axial deflection. Axial biasing element 1215 may comprise one or more springs; one or more elastomers under compression; or similar mechanisms. It will be understood that such variations are possible and within the scope of the disclosure. In this embodiment, there may be no axial biasing element between receiving interfaces 1110 and port main body 1102 and the receiving interfaces 1110 may be axially fixed.

In the embodiment disclosed in FIGS. 11, 12A, and 12B, the RF coupling mechanism provided by coupling interface 1128 and receiving interface 1110 may be substantially similar to that described above with regard to coupling interface 310 and receiving interface 210, including the use of inner and outer conductor baskets.

In this exemplary embodiment, each jumper 1115 with its corresponding coupling interface 1128 may be independently removed and inserted without disturbing the other jumpers 1115, which may be done while the other jumper 1115 are actively carrying RF signals. In this example, a given jumper 115 may be coupled by inserting coupling interface 1128 into aperture 1135 to where coupling interface 1128 fully engages corresponding receiving interface 1110 (as described above regarding coupling interface 310 and receiving interface 210). In this embodiment, axial biasing element 1215 biases coupling interface 1128 toward receiving interface 1110 until fully engaged. Further insertion of coupling interface 1128 compresses the axial biasing element 1215 to enable coupling interface 1128 to translate within aperture 1135 until lock 1210 disposed on the outer surface of coupling interface 1128 has translated inward beyond the corresponding lock (not shown) within aperture 1135, at which point radially rotating coupling interface 1128 engages the two locks, fixing the jumper 1115 within cluster connector 1140.

Removing a given jumper 1115 may involve pushing coupling interface 1128 axially inward toward cluster port 1105, thereby compressing axial biasing element 1215, enabling rotation of coupling interface 1128 by disengaging lock 1210 from its counterpart (no shown) within aperture 1135, thus enabling extraction of RF jumper 1115 from cluster connector 1140.

It will be understood that cluster connector 1140 may be engaged and disengaged with the cluster port 1105 with all or some of its apertures 1135 having jumpers 1115 simultaneously. In this case, the individual engagement of the coupling interface 1128 of each jumper 1115 with its counterpart receiving interface 1110 may be performed in a single motion of second connector body 1106, with the axial biasing elements 1215 of each jumper assembly acting independently, as described with the other exemplary embodiment above.

Figure 13:
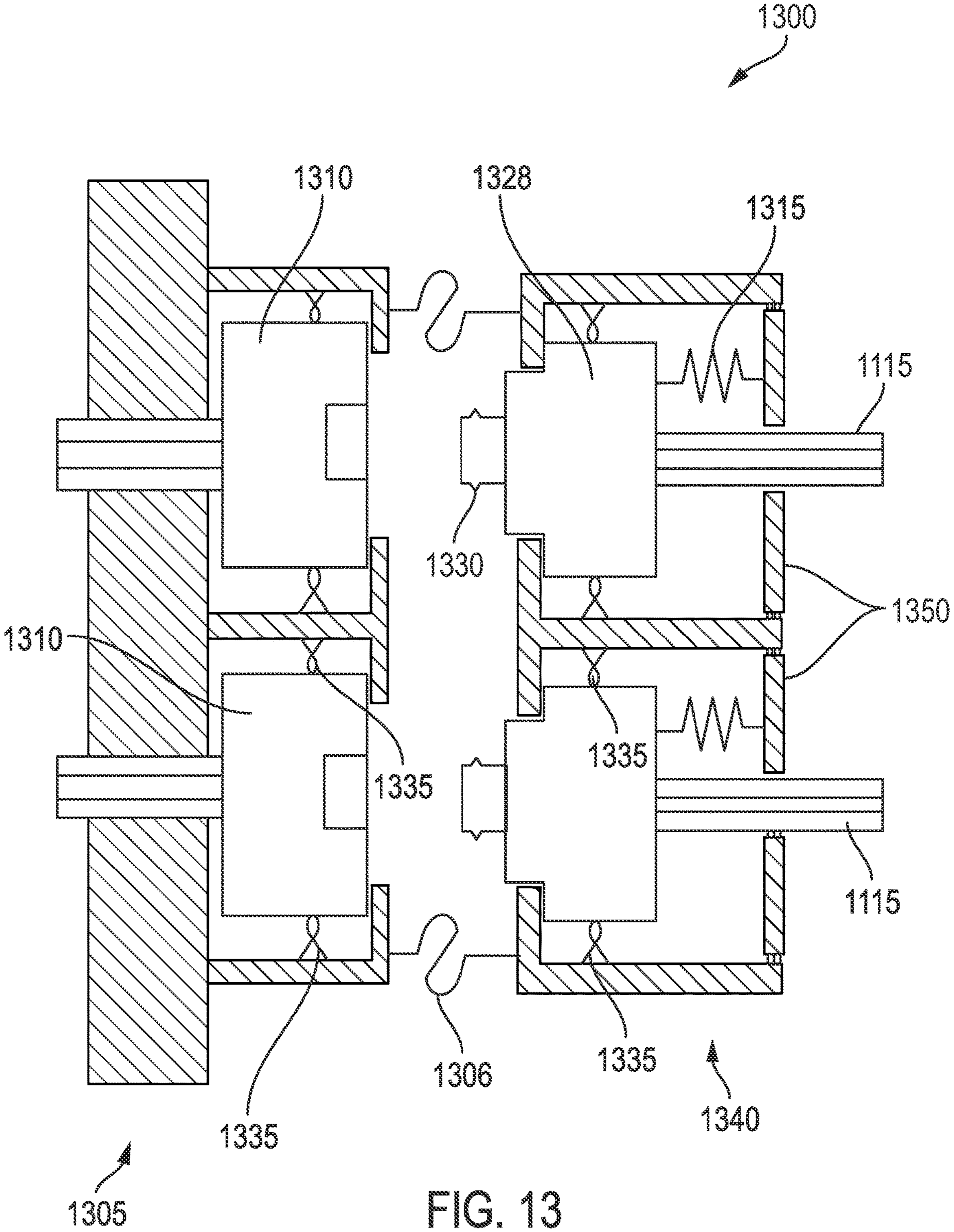
FIG. 13 is a cross sectional view of a cluster port and cluster connector wherein the axial biasing element is disposed within the cluster connector.

FIG. 13 illustrates a further embodiment 1300 of the cluster port 1305 and cluster connector 1340, wherein the axial biasing elements 1315 are disposed within the apertures of the cluster connector 1340 and provide an axial bias on a corresponding coupling interface 1328. Each aperture in the cluster connector 1340 may have a removable plug retention element 1350, which may enable removal and replacement of a given jumper 1115. Each coupling interface 1328 and receiving interface 1310 may have radial centering elements 1335 such as an O-ring similar to radial centering mechanism 1205 depicted in FIG. 11. The cluster port 1310 and cluster connector 1340 may be mechanically coupled using a cluster axial coupling mechanism 1306 like that described above with regard to hard mate lock 320 and 220 of FIG. 3 and FIG. 2, respectively. Coupling interface 1328 and receiving interface 1310 may mechanically engage and establish an RF connection using the mechanism described above regarding coupling interface 310 and receiving interface 210, or may use a conventional mechanism, such as that specified as a 4.3-10 interface or 2.2-5 interface. It will be understood that such variations are possible and within the scope of the disclosure.

Figure 14:
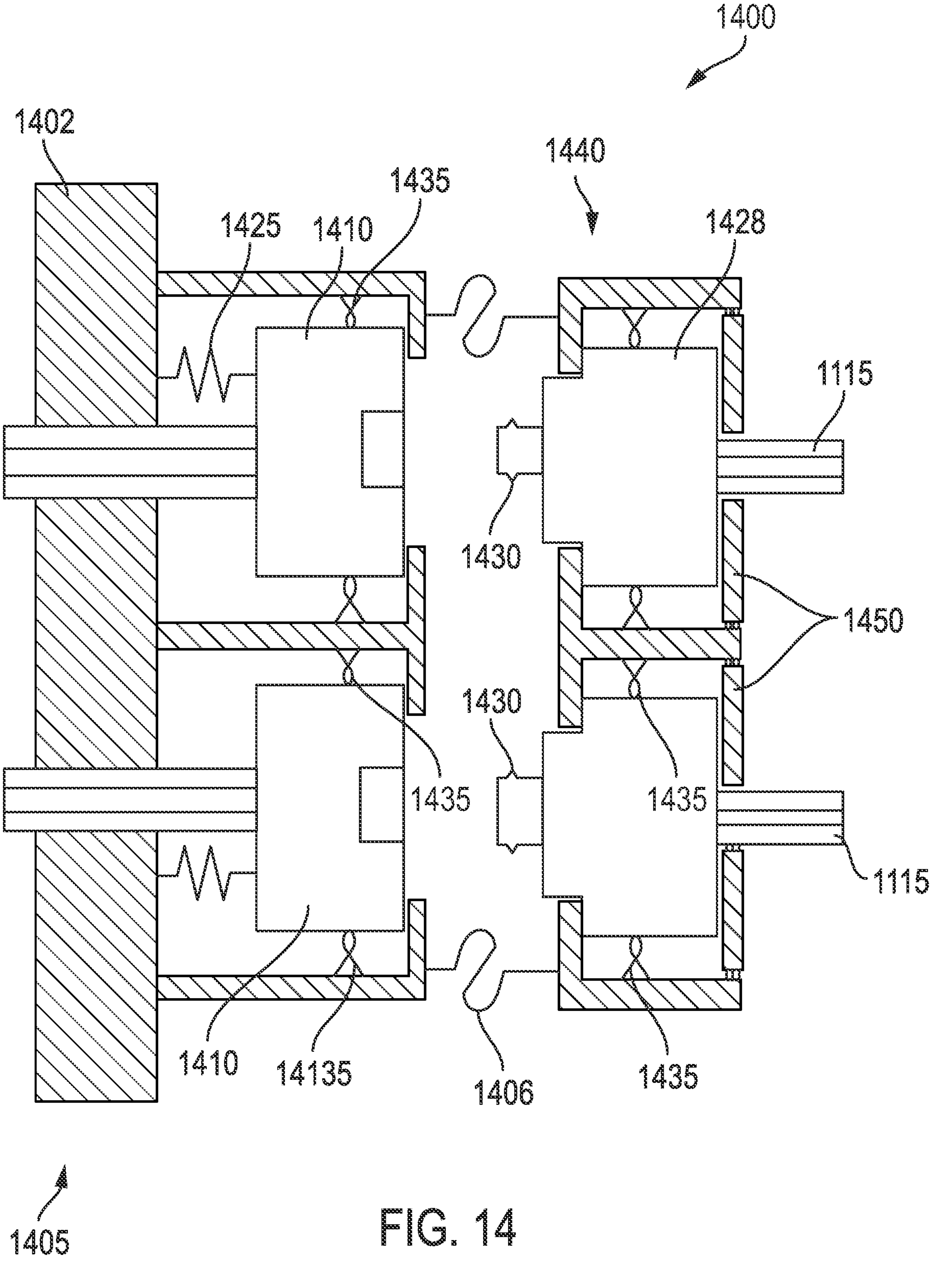
FIG. 14 is a cross sectional view of a cluster port and cluster connector wherein the axial biasing element is disposed within the cluster port.
Figure 15:
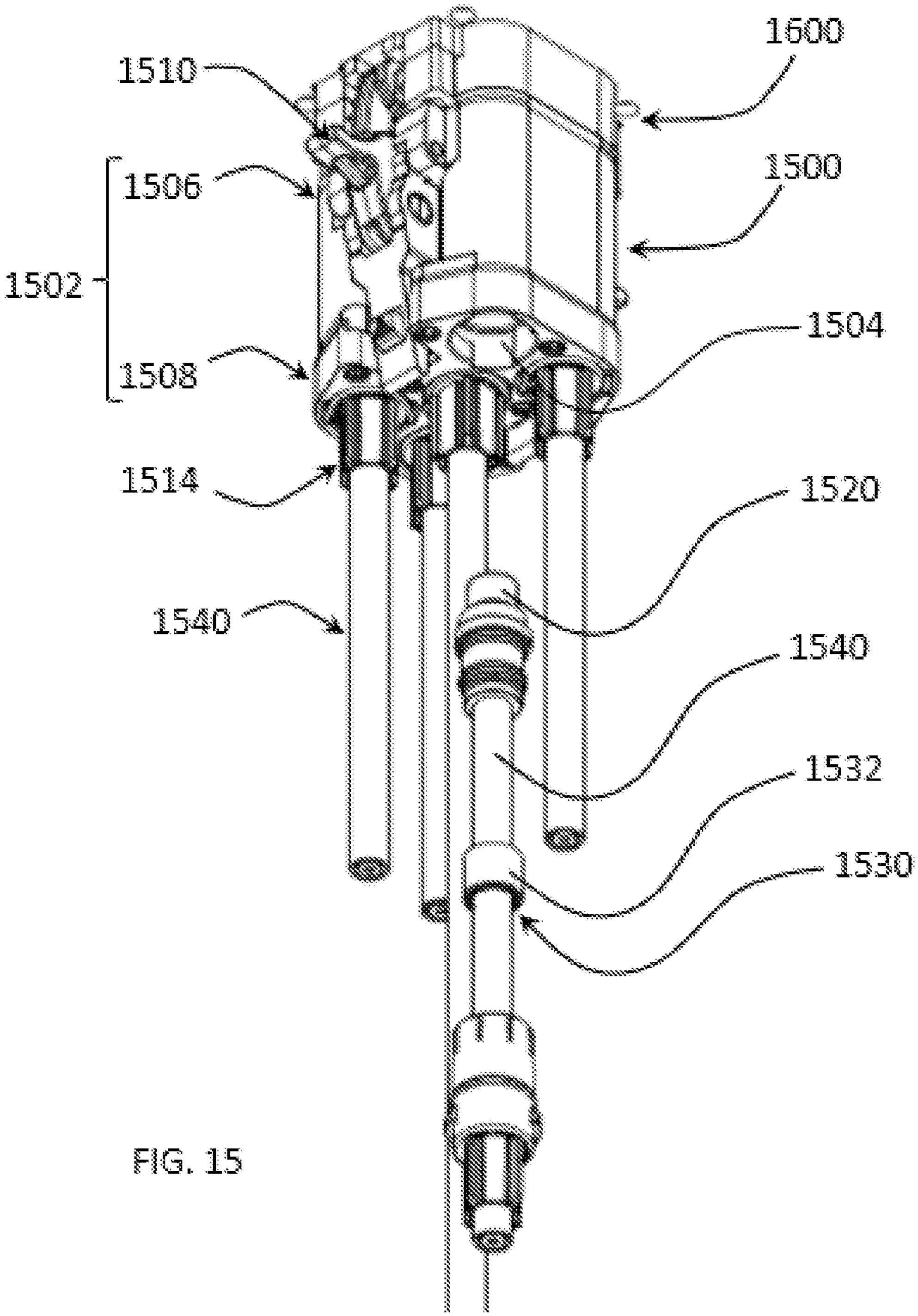
FIG. 15 illustrates another exemplary embodiment of the disclosed cluster connector in which the main connector body has a single piece that both hosts the aperture for the jumpers and the coupling mechanism for affixing the cluster connector to the cluster port.
Figure 16:
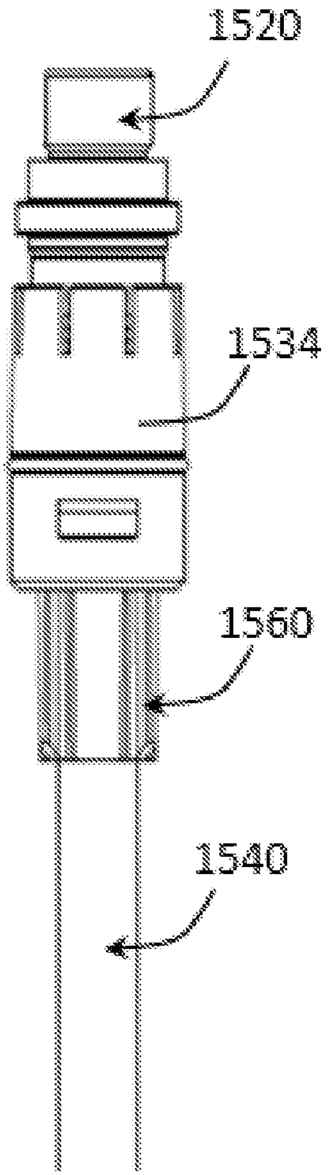
FIG. 16 is a profile view of an exemplary jumper lock mechanism operative to retain and release an individual RF cable from the connector body.
Figure 17:
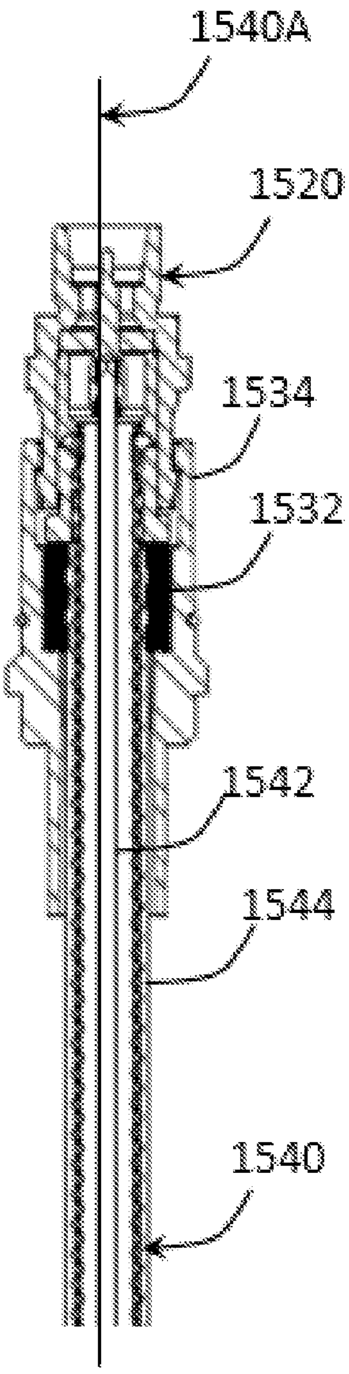
FIG. 17 is a sectional view of the jumper lock mechanism wherein the axial biasing element circumscribes and frictionally engages the RF cable and is operative to urge the coupling interface toward the cluster port.
Figure 18:
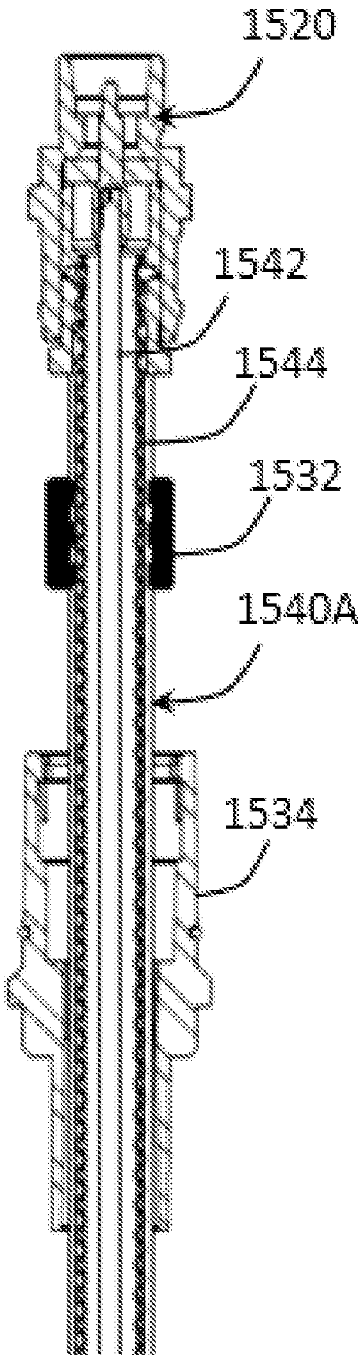
FIG. 18 is an exploded sectional view of the jumper lock mechanism and axial biasing element disposed over and around the RF cable.

FIG. 14 illustrates a further embodiment 1400 of cluster port 1405 and cluster connector 1440, wherein the axial biasing elements 1425 are disposed within the cluster port 1405 and provide axial biasing between receiving interface 1410 and main body 1402 of cluster port 1405. As illustrated, each jumper 1115 has attached to it a coupling interface 1428. Both the receiving interfaces 1410 and coupling interfaces 1428 have radial centering elements 1435, which may be substantially similar to the radial centering elements 1335 of FIG. 13. The cluster port 1405 and cluster connector 1440 may be mechanically coupled using an axial coupling mechanism 1406 like that described above with regard to hard mate lock 320 and 220 of FIG. 3 and FIG. 2, respectively.

For the embodiments of 1300 and 1400, the range of axial motion, and the force inherent to axial biasing elements 1325, 1425, enables one to over-engage the plugs (coupling interfaces) with the sockets (receiving interfaces) without causing damage to either component. Any excess force and travel of engagement of each individual plug/socket pair results in a deflection of its corresponding axial biasing element, allowing the plug or socket to move to its optimal axial position while still maintaining sufficient force on the coupling interface/receiving interface to ensure rigid axial coupling.

In the exemplary embodiments shown in FIGS. 13 and 14, the body of the cluster connector 1310, 1410 and coupling interface 1328, 1428 may each or both be formed of an engineered polymer. Further, substantially any of the components of embodiments 1300, 1400 that are not intended to carry electrical signals may be formed of an engineered polymer of suitable strength, such as commercial grades of Nylon or ABS. Otherwise, all of the signal-carrying components and other of the remaining components may be formed of any non-ferromagnetic metal. Most commonly used are copper alloys, typically brass, with a high conductive plating such as silver.

Another embodiment of a cluster connector 1500 is depicted in FIG. 15 thru 18. The cluster connector 1500 comprises: (i) a connector body 1502 having a plurality of connector apertures 1504; (ii) a coupling device 1510 rotatably coupled to the connector body 1500 and configured to connect the connector body 1502 to a cluster port 1600; (iii) a plurality of coupling interfaces 1520 (one per jumper 1540), each coupling interface 1520 disposed at least partly within a corresponding one of the plurality of connector apertures 1504 and configured to translate axially relative to the connector body 1502; and (iv) anaxial biasing element 1530 configured to effect axial displacement of each coupling interface 1520 relative to the respective connector aperture 1504.

Similar to the embodiments discussed supra, the connector body 1502 may comprise a first and second body, 1506 and 1508, respectively, wherein the first connector body 1506 is coupled to the cluster port 1600 and the second connector body 1508 mechanically couples to each jumper 1540 by a corresponding strain relief 1514 interposing the jumper 1540 and the second connector body 1508. Furthermore, each coupling interface 1520 may be integral to a jumper 1540 having a signal transmitting inner conductor 1542 and a grounding outer conductor 1544. Moreover, referring to FIG. 17, the inner conductor 1542 of each jumper 1540 defines a longitudinal axis 1540A and the axial biasing element 1530 produces an axial force F along the longitundinal axis 1540A of the inner conductor 1542.

In this embodiment, the axial biasing element 1530 functions to: (i) bias the coupling interface 1520 toward the cluster port and (ii) provides an environmental seal for prohibiting the influx of debris into or between the coupling interface 1520 and the respective aperture associated with a cluster port 1600. Furthermore, the axial biasing element 1530 is seated within a jumper lock mechanism 1534 which radially centers and axially retains the jumper 1540 within a respective aperture 1504 of the connector body 1502. Hence, the axial biasing element 1530 functions in combination with the jumper lock mechanism 1534 to bias the coupling interface, while locking and releasing the RF cable 1540 relative to the connector body 1502. As such, an operator may release one of the coupling interfaces 1520 without releasing or disturbing the remaining coupling interfaces 1520.

In the described embodiment, the axial biasing mechanism 1530 may include a resilient sleeve 1532 disposed between the connector body 1502 and the coupling interface 1520. In the described embodiment, the resilient sleeve 1532 may be fabricated from a resilient rubber, elastomer, polymer, or silicone.

The resilient sleeve 1532 circumscribes an outer jacket 1542 of the jumper 1540 to radially center and lock the jumper 1540 within and relative to, the repective connector aperture 1504 of the connector body 1502. More specifically, the resilient sleeve 1532 is disposed between and frictionally engages the respective connector aperture 1504 of the connector body 1502 and either the coupling interface 1520 and the outer jacket 1546 of the jumper 1540. To minimizes the stress acting on the cable 1540, a strain relief portion 1560 may be interposed between the jumper 1540 and the connector body, i.e., the second connector body. In the described embodiment, the axial force imposed by the axial biasing element 1530, i.e., the force imposed on the coupling interface 1520, is about 15 to about 25 Newtons.

Figure 19:
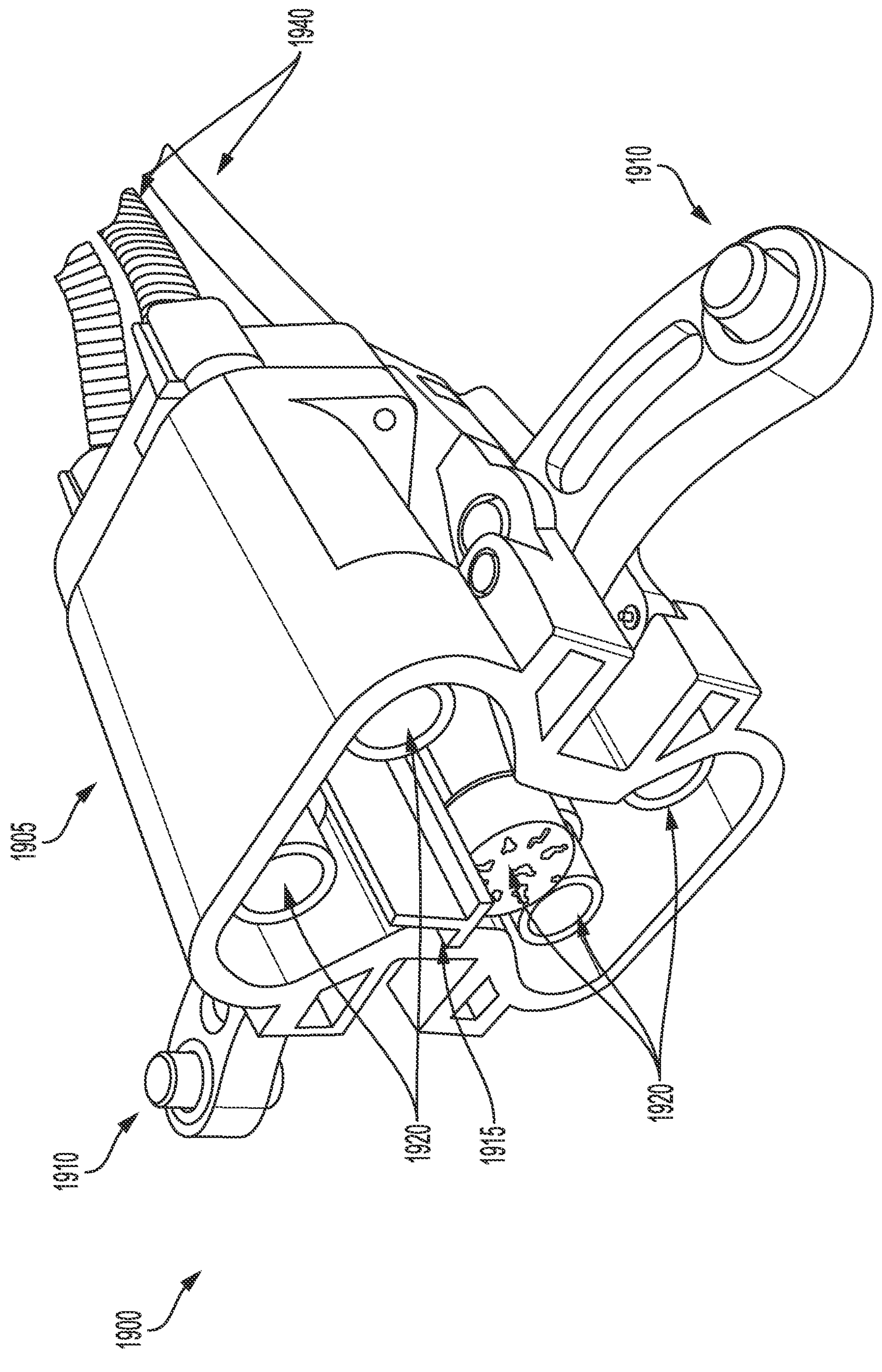
FIG. 19 illustrates a variation of the exemplary cluster connector of the embodiment of FIG. 15.

FIG. 19 illustrates another exemplary cluster connector 1900 according to the disclosure. Cluster connector 1900 includes a connector body 1905, and a clamping mechanism that, in the illustrated example, includes a pair of clamping arms 1910. Connector body 1905 may be formed of a single piece of polymer that has a plurality of apertures (not shown) configured to receive a corresponding set of jumpers 1940, each of the jumpers 1940 having a coupling interface 1920. Clamping arms 1910 may be formed of metal or polymer and may be configured to engage with corresponding mating components (not shown) disposed on a cluster port, an example of which is described with reference to FIG. 20 below.

Figure 20:
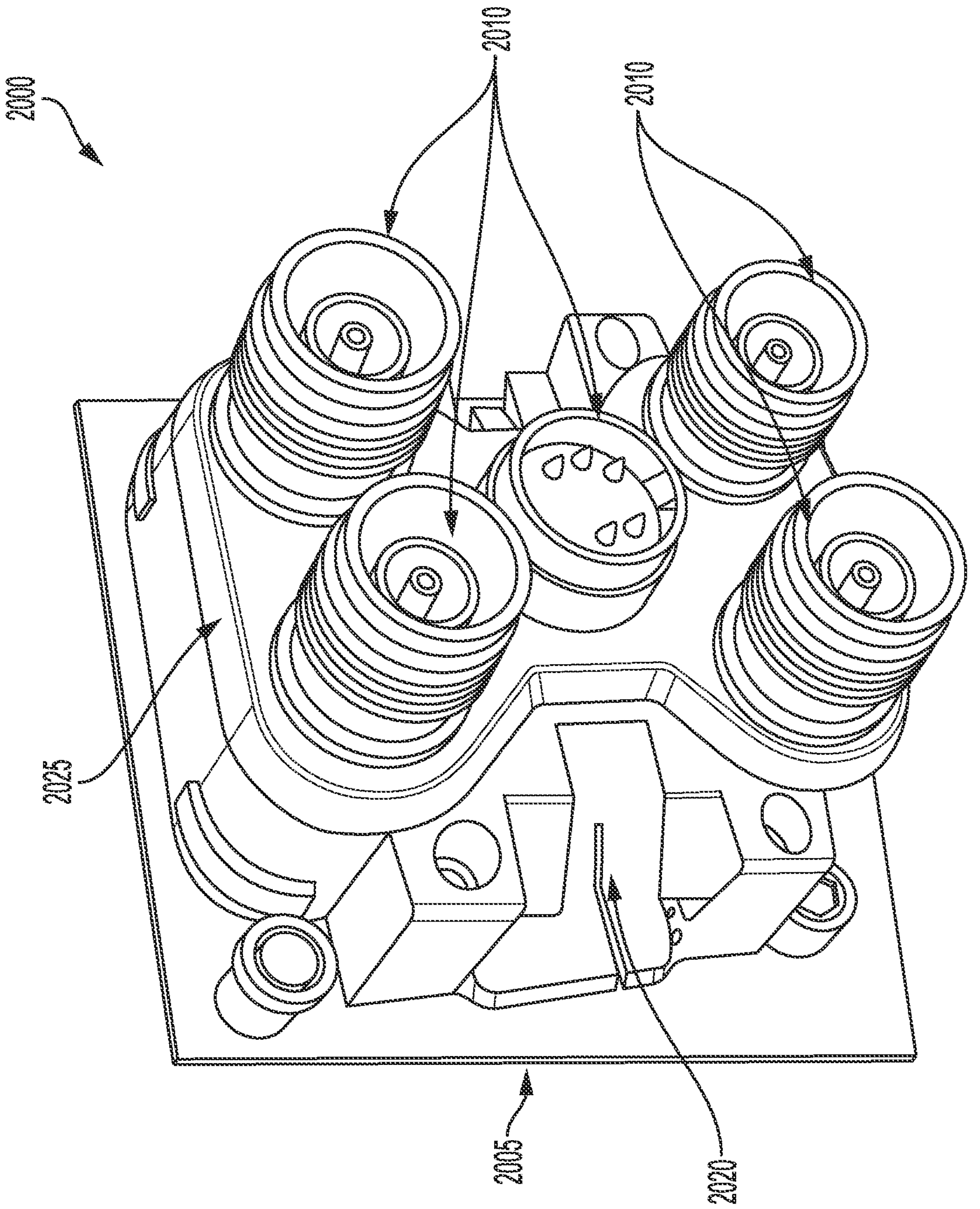
FIG. 20 illustrates a variation of the exemplary cluster port of the embodiment of FIG. 15.

Connector body 1905 includes a guide key 1915, which, in conjunction with a corresponding slot in an exemplary cluster port of FIG. 20, assures proper orientation of cluster connector 1900 as it is mated with the cluster port.

The coupling interfaces 1920, as well as their corresponding jumpers 1940, may be substantially similar to coupling interfaces 1520 and jumpers 1540 described above. For example, the respective mechanisms for individually inserting and removing jumpers 1940 may involve the same jumper lock mechanism 1534, along with the different variations and deployments of axial biasing elements.

One or more of the jumpers 1940 may carry a different type of signal to be used by the antenna 102. As described above, the jumpers 1940 and their corresponding coupling interfaces 1920 have an RF connector. However, for example, one of the jumpers 1940 may carry digital or power signals, such as may be used for operating electronic devices internal to antenna 102, such as a Remote Electrical Tilt (RET) mechanism. In this case, the jumper 1940 and coupling interface 1920 for that particular connection may have a conductor arrangement in conjunction with AISG (Antenna Interface Standards Group) specifications. Alternatively, one of more jumpers 1940, and its corresponding coupling interface 1920, may have a fiber optic line and connector, respectively. Regardless of the variation, a common trait among these different types of jumpers 1940 is that its coupling interface 1920 has a jumper lock mechanism as disclosed above, which may be the jumper lock mechanism 1534. In the exemplary cluster connector 1900 illustrated in FIG. 19, a center coupling interface 1920 has a connector interface consistent with an AISG signal connection (i.e., an AISG connector). It will be understood that such variations are possible and within the scope of the disclosure.

FIG. 20 illustrates an exemplary cluster port 2000, which may be used as the counterpart to cluster connector 1900. Cluster port 2000 may have a cluster port body 2005, within which are disposed a plurality of apertures, each aperture having a receiving interface 2010. Each receiving interface 2010 is configured to mate with a corresponding coupling interface 1920 in cluster connector 1900. Cluster port body 2005 also has an alignment slot (not shown) that receives guide key 1915 in the cluster connector, to assure proper alignment. Cluster port body 2005 has a counterpart clamping mechanism to that on cluster connector 1900. In this example, the counterpart clamping mechanism has two receptacles 2020 for receiving clamping arms 1910.

Cluster port 200 may also have an axial biasing pad 2025 that is disposed on cluster port body 2005. Axial biasing pad 2025 serves as an axial biasing member for the entire cluster connector 1900 such that, when cluster connector 1910 is coupled to cluster port 2000, it provides an outward force against cluster connector 1900. In doing so, it provides both resistance and rigidity as the clamping arms 1910 are engaged. It also provides a seal.

As mentioned above, each jumper 1940 may be selectively and individually removed and replaced either in the field. This may be done one of two ways: while the cluster connector 1900 is coupled to the cluster port 2000 on the antenna 102; or by removing cluster connector 1900 from cluster port 2000 and exchanging one or more jumpers 1940 with the cluster connector removed. Both are viable options. However, it may be easier to swap out one or more jumpers 1940 from cluster connector 1900 with the cluster connector 1900 removed because the force involved to engage the jumper lock mechanism 1534 is driven by the force required to compress the axial biasing element 1530 of that given jumper 1940. Alternatively, swapping out one or more jumpers with the cluster connector 1900 coupled to cluster port 2000 requires the application of force to compress the axial biasing element 1530 or the given jumper 1540 as well as the axial biasing pad 2025 of cluster port 2000.

Each of the above disclosed embodiments share the feature whereby individual jumpers may be removed and inserted into the cluster connector without disturbing the connections of the other jumpers. This includes scenarios wherein the cluster connector is already installed on a cluster port and individual RF cables in the cluster connector are coupled to their corresponding radiator elements within the antenna. In this scenario, an individual jumper may be removed from the cluster connector and replaced without interrupting the signal transmissions in the other jumpers. This shared feature also facilitates manufacturing and testing whereby each jumper may be tested and potentially swapped out with a different jumper for that corresponding aperture in the cluster connector. Further, it is possible to replace a given jumper with a jumper of a different signal type (e.g., AISG, fiber, etc.), provided that the corresponding receiving interface is compatible with the coupling interface of the new jumper.

What is claimed is:

1. A cluster connector, comprising:

a primary connector body having a plurality of connector apertures;

a plurality of coupling interfaces, each coupling interface corresponding to a jumper, each of the coupling interfaces disposed at least partly within a corresponding connector aperture, each of the coupling interfaces having a jumper lock mechanism disposed on an outer surface; and a secondary connector body including a hard mate lock; and wherein each jumper lock mechanism enables removal of the corresponding jumper without disturbing the other jumpers.

2. The cluster connector of claim 1, wherein the jumper lock mechanism comprises an O-ring seal, wherein the O-ring seal engages with an inner surface of the corresponding connect or aperture.

3. The cluster connector of claim 1, wherein the hard mate lock comprises a coupling nut that is rotatably coupled to the secondary connector body.

4. The cluster connector of claim 1, further comprising an axial biasing means.

5. The cluster connector of claim 1, wherein each coupling interface comprises an axial biasing element configured to apply an axial pressure on each of the coupling interfaces in a direction toward a receiving interface.

6. The cluster connector of claim 5, wherein the axial biasing element comprises a spring.

7. A cluster connector, comprising:

a primary body having a plurality of apertures; and a plurality of jumpers, each jumper corresponding to an aperture, each jumper having an RF plug and a coupling interface, and an axial biasing element disposed between the RF plug and the coupling interface, the RF plug and coupling interface configured to translate axially relative to one another over a zone of axial deflection, wherein each coupling interface is configured to allow removal and insertion of a corresponding jumper without affecting operation of each of the other plurality of jumpers.

8. The cluster connector of claim 7, further comprising a hard mate lock disposed on an outer surface of the coupling interface.

9. The cluster connector of claim 7, wherein the axial biasing element has a deflection force that is greater than a force required to mechanically engage the RF plug and a corresponding receiving interface to create an RF connection.

10. The cluster connector of claim 7, wherein the axial biasing element is disposed within a cavity defined by the RF plug and the coupling interface.

11. The cluster connector of claim 10, wherein the axial biasing element comprises an elastomer under compression.

* * * * *